Figure 1:
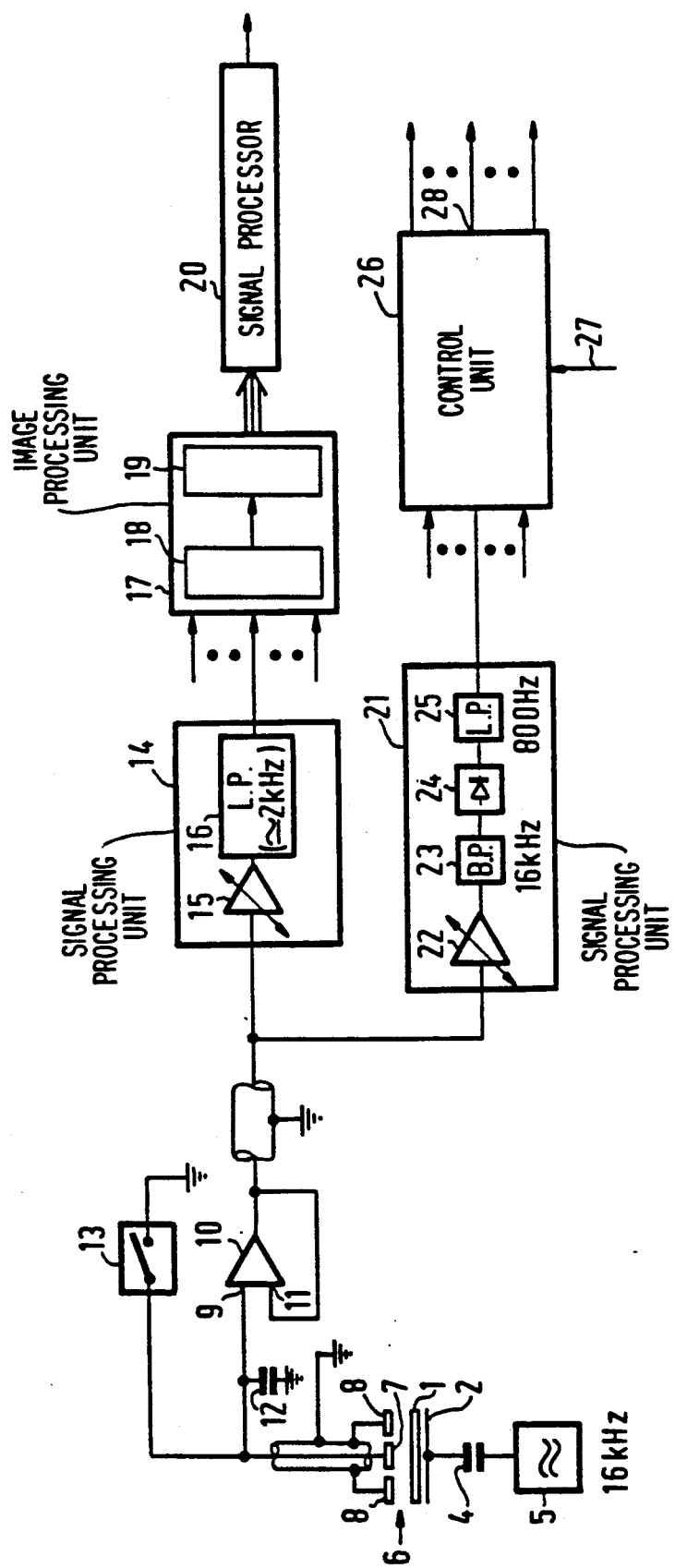

United States Patent [19]

Hillen et al.

[11] Patent Number: 5,097,493
[45] Date of Patent: Mar. 17, 1992

[54] DEVICE FOR SCANNING AN X-RAY IMAGE

[75] Inventors: Walter Hillen; Ulrich Schiebel, both of Aachen, Fed. Rep. of Germany

[73] Assignee: U.S. Philips Corporation, New York, N.Y.

[21] Appl. No.: 655,006

[22] Filed: Feb. 12, 1991

[30] Foreign Application Priority Data

Feb. 13, 1990 [DE] Fed. Rep. of Germany ....... 4004348

[51] Int. Cl.$^5$ .......................................... G03G 13/044
[52] U.S. Cl. .......................................... 378/99; 378/28; 378/29; 378/32; 358/111
[58] Field of Search .................................. 378/98–100, 378/28–32, 62; 358/111, 477; 355/200, 219, 246, 265; 324/457, 458, 72.5, 76 R, 123 R

[56] References Cited

U.S. PATENT DOCUMENTS 4,134,137 1/1979 Jacobs et al. .......................... 378/32

OTHER PUBLICATIONS

Proceedings of SPIE-The International Society for Optical Engineering, "Image Quality in Selenium-Based Digital Radiography", vol. 626, 1986, pp. 176–184.

Primary Examiner—Janice A. Howell
Assistant Examiner—David P. Porta
Attorney, Agent, or Firm—William Squire

[57] ABSTRACT

A plurality of electrometer probes scan the charge pattern of a photoconductor (1), the distance between the electrometer probes (6) and the photoconductor (1) being measured via an alternating voltage applied to the photoconductor (1). The alternating voltage is scanned by the electrometer probes and is filtered out to extract distance measuring signals. The output signals of all electrometer probes (6) are used for determining image values of the X-ray image, the output signals of at least some of the electrometer probes (6) also being used, via a suitable filter (23), for determining the distance measuring signals. An adjusting device adjusts the distance between the electrometer probes (6) and the photoconductor (1) continuously to a reference value, in dependence on the value of the measuring signals, during the scanning operation.

18 Claims, 2 Drawing Sheets

DEVICE FOR SCANNING AN X-RAY IMAGE

The invention relates to a device for scanning an X-ray image during which a previously locally uniformly charged photoconductor provided on an electrically conductive substrate is discharged in dependence on the local radiation intensity, using several electrometer probes which scan the charge pattern of the photoconductor, the distance between the electrometer probes and the photoconductor being measured by means of an alternating voltage which is applied to the substrate, which is scanned by means of electrometer probes and which is filtered out in order to extract distance measuring signals.

Of interest are commonly owned copending application Ser. No. 644,720 entitled "Method for the Measurement of X-rays or Gamma Rays, and Measuring Device Suitable for carrying out the Method" filed Jan. 23, 1991 in the name of W. Lumma, and Ser. No. 644,713 and Ser. No. 644,712 both entitled "Sensor Matrix" filed Jan. 23, 1991 in the name of Conrads et al.

The publication "Proceedings of SPIE", Vol. 626, 1986, pp. 176-184, discloses a device of this kind in which an initially uniformly charged photoconductor is discharged to a varying extent, in dependence on the local radiation intensity, during a subsequent X-ray exposure. The charge image then existing on the photoconductor is scanned by means of a plurality of electrometer probes arranged in a row.

A problem is encountered in that the magnitude of the charge measured is dependent on the distance between the electrometer probes and the photoconductor. For the measurement of this distance the device disclosed in the cited publication utilizes two extreme electrometer probes of the row of electrometer probes not for determining image values but for measuring the intensity of an alternating voltage signal applied to the photoconductor or the substrate. Because this measured signal is also dependent on the magnitude of the air gap between the electrometer probes and the photoconductor, it can be used for determining the distance. The two electrometer probes for determining the distance are not used for determining image values and conversely, the electrometer probes used for determining the image values are not used for determining the distance. The distance values measured by means of the two electrometer probes are used to determine the actual air gap for each of the electrometer probes on a mathematical basis in order to correct the image signals thereof accordingly. A problem is then encountered in that for the image electrometer probes which are situated between the two distance measuring electrometer probes the distances can only be approximated by way of a linear interpolation. However, in reality the photoconductor is usually not flat, so that the distances between at least individual electrometer probes and the photoconductor cannot be correctly determined and their image values cannot be optimally corrected either.

It is an object of the invention to improve a device of the kind set forth.

To achieve this, in accordance with the invention the output signals of the electrometer probes are used for determining image values of the X-ray image, the output signals of at least some of the electrometer probes also being used, via a suitable filter, for determining the distance measuring signals, there being provided adjusting means whereby the distance between the electrometer probes and the photoconductor is continuously adjusted to a reference value, in dependence on the measuring signals, during the scanning of the X-ray image.

In this device, therefore, the output signals of all electrometer probes are used for determining the image values of the X-ray image. It is not necessary to provide electrometer probes which serve only for determining the distance and which do not supply image values.

The output signals of at least some of the electrometer probes used for determining the image values are at the same time used for determining the distance measuring signals. To this end, the alternating voltage is filtered out, for example by means of a bandpass filter which supplies a measuring signal which depends on the distance between the photoconductor, whereto the alternating voltage is applied via the substrate, and the relevant electrometer probe. In order to prevent interference with the image signals supplied by the electrometer probes, the frequency of said alternating voltage signal is to be chosen so that it exceeds the highest frequency occurring in the image signal. For the determination of the image values, the image signals are to be applied to a low-pass filter so that the measuring alternating voltage is filtered out.

The distance can be directly determined on the basis of the distance measuring signals thus filtered out.

There are provided adjusting means whereby the distance between the electrometer probes and the photoconductor can be adjusted. These adjusting means are used for continuous readjustment of this distance, in dependence on the measuring signals, during the scanning of an X-ray image, so that a predetermined reference value is maintained. Thus, the image values supplied by the electrometer probes need not be corrected at a later stage. To the contrary, the distance is continuously adjusted during the scanning so that it remains the same and equal to a given reference value. The device thus offers the advantage that the reference distance can be comparatively small because of the continuous correction of the distance values, so that the probes scan only the associated area of the photoconductor and not the neighbouring areas. This results in a suitable locational resolution of the X-ray image scanned.

Moreover, a small distance between the probes and the photoconductor also enhances the sensitivity of the probes, i.e. the signal-to-noise ratio of the signals supplied thereby, is improved.

In the ideal case, scanning correction can be performed for each electrometer probe individually. To this end, in accordance with the invention the output signals of each sensors is used for determining the image values as well as the distance measuring signals, the electrometer probe being adjusted to the reference distance by means of the adjusting means on the basis of the measuring signal supplied by the probe.

It has been found that it is not absolutely necessary to provide adjusting means for each electrometer probe individually, because the distance fluctuations between the electrometer probes and the photoconductor do not change substantially over the comparatively small distance between the probes. Therefore, it usually suffices to provide adjusting means for a group of electrometer probes, which means readjust the entire group. To this end, in a further embodiment of the invention each time a group of neighboring electrometer probes is positioned by the adjusting means on the basis of the measuring signals supplied by the group, so that the reference distance is maintained on average.

In further embodiments of the invention, the adjusting means are piezoelectric elements or electrodynamic means. Such adjusting means have a simple construction and are still capable of quickly following the distance variations occurring during scanning.

In a further embodiment of the device in accordance with the invention, the distance measuring signals are extracted from the output signals of the electrometer probes by means of bandpass filters, the measuring signals thus filtered being applied to a control circuit which compares the measuring signals with a reference value and which controls the adjusting means so that the reference distances are maintained.

The alternating voltage signal applied to the photoconductor must be in a frequency range outside that of the signals which occur during the scanning of the charge image. Preferably, the measuring signal is situated in a frequency range beyond the frequency range of the image values. The output signals supplied by the electrometer probes are applied to a respective bandpass filter in order to determine the distance measuring signals, the filter filtering out the corresponding alternating voltage signal. The measuring signals thus filtered out are again applied to a control circuit. In this control circuit each of the measuring signals supplied by the electrometer probes is compared with a reference value. When the measuring values deviate from the reference signal, the adjusting means associated with the relevant electrometer probe are controlled so that the distance measuring signals again equal the reference value. The reference distance between the relevant electrometer probe and the photoconductor is thus also adjusted. During the scanning of a charge image on the photoconductor, during which the photoconductor is moved relative to the row of electrometer probes, the distance between the electrometer probes and the photoconductor is thus continuously corrected.

For the use of the device in accordance with the invention in an X-ray examination apparatus a special advantage is obtained in that in such examination apparatus low radiation doses are used in order to minimize the radiation load for the object to be examined. Notably in the case of small radiation doses a deviating or excessive distance between electrometer probes and photoconductor has a substantial effect, because the signals wherefrom the image values are extracted already have a comparatively small signal-to-noise ratio. Thus, in such a case exact readjustment of the distance is particularly important.

Figure 2:
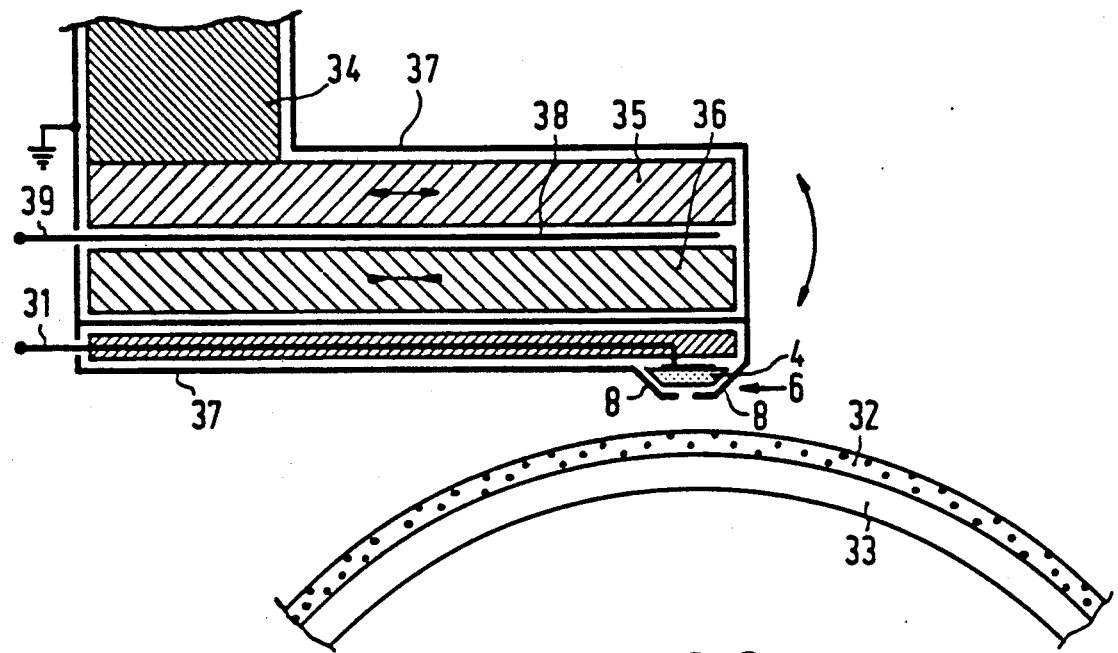
Figure 3:
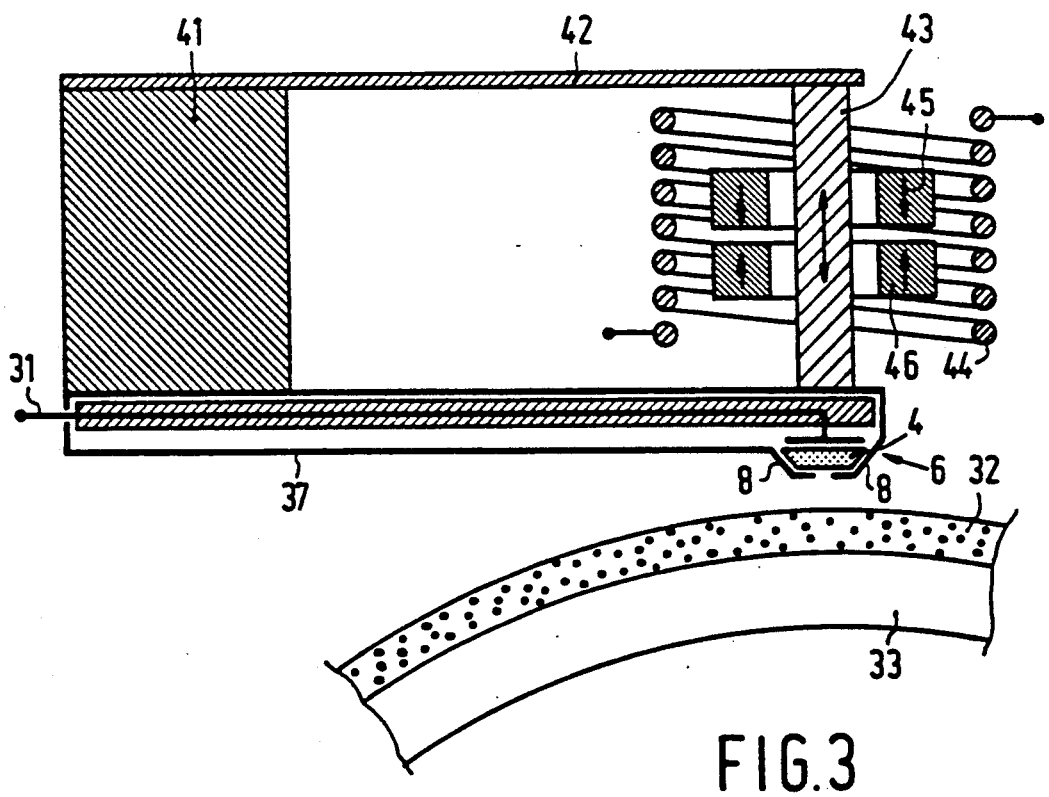

IN THE DRAWINGS:

An embodiment in accordance with the invention will be described in detail hereinafter with reference to the drawing. Therein:

FIG. 1 shows a circuit arrangement of a part of a device for scanning an X-ray image, which device incorporates distance control, FIG. 2 is a sectional view of a first embodiment of the device, comprising piezoelectric adjusting means, and FIG. 3 is a sectional view of a second embodiment of the device comprising electrodynamic adjusting means.

FIG. 1 shows a circuit diagram of a device for scanning an X-ray image by means of electrometer probes whose output signals are used for determining image values as well as for determining distance measuring signals. FIG. 1 shows the relevant signal processing mainly for one electrometer probe only. In practice, however, a similar signal processing is provided for each electrometer probe.

FIG. 1 diagrammatically shows a photoconductor 1 provided on an electrically conductive substrate 2. The photoconductor 1 may either be flat, as shown in the Figure, or shaped as a drum. The photoconductor is uniformly electrically charged prior to an X-ray exposure in a manner not shown in the Figure. During the X-ray exposure, the photoconductor is locally discharged to a different degree, in dependence on the intensity of the X-rays, in a manner which is not shown in the Figure. The charge image thus obtained is subsequently scanned.

Furthermore, the photoconductor 1 is connected, via the substrate 2 and a capacitance 4, to an alternating voltage source 5 which generates, for example an alternating voltage signal having a frequency of 16 kHz. This alternating voltage is applied to the substrate, via the capacitance 4, and serves to generate the distance measuring signals.

In FIG. 1 an electrometer probe 6 is shown at a given distance from the photoconductor 1, which probe comprises a centrally arranged scanning electrode 7 and shielding electrodes 8 which are arranged around the scanning electrode 7. In the circuit diagram of FIG. 1 only one electrometer probe 6 is indicated; a device for scanning a charge pattern, however, in practice comprises several of such electrometer probes 6.

The scanning electrode 7 of the electrometer probe 6 is connected to one input 9 of an operational amplifier 10 which amplifies the signals supplied by the electrometer probe 6. The output signal of the amplifier 10 is fed back to a further input 11 of the amplifier. One of the inputs 9 or 11 of the operational amplifier is the negative input, so that the operational amplifier operates as an impedance transformer. The amplifier 10 has an input capacitance which is shown in FIG. 1 as a discrete capacitor 12, connected to ground, for the sake of clarity.

The scanning electrode 7 of the electrometer probe 6, moreover, is connected to a switch 13 via which the scanning electrode can be connected to ground so as to drain any charges present prior to the scanning of an X-ray image.

The output signal of the amplifier 10 is applied to a first signal processing unit 14 in which the signals required for generating the image values are filtered out. To this end, the signal processing unit 14 comprises an amplifier 15. The amplifier 15 is succeeded by a low-pass filter 16 which, has a limit frequency of, for example, approximately 2 kHz.

The output signal of the filter 16 is applied to an image processing unit 17 which comprises a multiplexer 18. As is denoted by several arrows in the Figure, the multiplexer 18 comprises as many inputs as there are electrometer probes provided for scanning. Each of the inputs is connected to a complete signal processing channel, comprising an electrometer probe 6, an amplifier 10 and a signal processing unit 14. The low-pass filtered output signals of all electrometer probes present in a device are thus applied to the multiplexer 18.

The multiplexer 18 in the image processing unit 17 is succeeded by an analog-to-digital converter 19 which converts the image values into digital values.

The analog-to-digital converter may then be succeeded, for example by a signal processor 20 which is only diagrammatically indicated in the Figure and which serves for the further processing of the image values.

The output signals of the amplifier 10 are also applied to a second signal processing unit 21 in which the distance measuring signals are extracted. To this end, the unit 21 comprises first of all an amplifier 22 whose output signals are applied to a bandpass filter 23 which is tuned to the frequency of the alternating voltage generator 5. The output signals of the bandpass filter 23 are rectified by a rectifier 24. The signals thus rectified are applied to a low-pass filter 25 which has, for example an upper limit frequency of approximately 800 Hz. Thus, the output of the low-pass filter 25 carries a voltage signal whose value is a measure of the distance between the electrometer probe 6 and the photoconductor 1.

This output signal of the low-pass filter 25 is applied to a control unit 26. The control unit 26 again comprises as many inputs as there are probes. Each of the inputs is connected to an electrometer probe 6 and the subsequent, associated signal processing circuitry. The control unit 26 compares the measuring signals applied thereto with a reference value applied to an input 27 and generates, on the basis of these comparisons, output signals which are available on outputs 28 and which control adjusting means (not shown in FIG. 1) whereby the relevant electrometer probes are again adjusted to the desired reference distance.

The operation of the device shown in FIG. 1 will be described in detail hereinafter.

After a charge pattern has been formed on the photoconductor 1 in the described manner by exposure to X-rays, the charge pattern is scanned by means of a plurality of electrometer probes, only one electrometer probe 6 being shown by way of example in FIG. 1. During scanning, the substrate 2 of the photoconductor 1 receives an alternating voltage from the alternating voltage source 5. The charge image formed on the photoconductor 1 by the X-rays and the alternating voltage signal from the generator 5 coupled to the photoconductor 1 produce a corresponding charge shift in the scanning electrode 7 and the capacitance 12 connected thereto. This charge shift is amplified by means of the amplifier 10. The signal thus amplified contains the signals originating from the charge pattern produced by the X-rays as well as the signals which originate from the alternating voltage supplied by the alternating voltage generator 5. This signal is applied to the first signal processing unit 14 in which, via a low-pass filter, the signal components are filtered out which are required for generating the image values. The signal components of higher frequency, originating from the alternating voltage generator 5, however, are supressed by means of the low-pass filter. Thus, subsequent to the low-pass filter 16 only signals originating from the charge pattern are present. These signals are further processed in the image processing unit 17. This is performed in the same way for all sensors provided in a device which is not shown in the Figure.

The signal emanating from the amplifier 10 is also applied to the second signal processing unit 21 in order to generate the distance measuring signals. The bandpass filter 23 in this unit filters out only the signal component induced on the electrometer probe 6 due to the alternating voltage supplied by the generator 5. Only this measuring signal is further processed in that first it is rectified, followed by low-pass filtering. Thus, a voltage signal is obtained which represents the distance measuring signal and whose value is a measure of the distance between the electrometer probe 6 and the photoconductor 1. This distance measuring signal is applied to the control unit 26. In a manner not shown in FIG. 1, this holds good for all distance measuring signals of the device. In the control unit 26 the distance measuring signals are compared with a reference value which represents a reference distance between the electrometer probes and the photoconductor. In dependence on the difference between the actual distance measuring signal measured and its reference value, the control unit 26 generates a signal which is available on the outputs 28 and which controls the control means associated with the relevant electrometer probes so that their distance measuring signals again equal the reference value so that the desired distance between electrometer probe and photoconductor is restored.

In order to illustrate the fact that the image value signal as well as the distance measuring signal is dependent on the distance between the surface of the photoconductor 1 and the electrometer probe 6, attention is drawn to the following relationships.

The voltage $U_m$ present on the input 9 of the amplifier 10 is subject to the following relationship:

$$U_m = -Q_s/C_m,$$

where $Q_s$, is the influence charge applied to the scanning electrode 7 of the electrometer probe 6. $C_m$ is the overall capacitance on the input of the amplifier 10 which is represented as a separate capacitor 12 in the representation of FIG. 1.

For the influence charge $Q_s$ applied to the scanning electrode 7 it holds good that:

$$Q_s = -\frac{A}{1 + k\frac{d_2}{d_1}} \cdot \left(D_Q + \frac{k\epsilon_o}{U_{HF}d_1}\right)$$

where:
- A: the useful surface area of the scanning electrode 4 of the electrometer probe 6,
- $d_1$: the layer thickness of the photoconductor 1,
- $d_2$: the distance between the probe 6 and the surface of the photoconductor 1,
- K: the dielectric constant of selenium,
- $D_Q$: the surface charge density on the photoconductor 1,
- $\epsilon_o$: the dielectric constant of air, and
- $U_{HF}$: voltage value of the alternating voltage supplied by the alternating voltage source 5.

This illustrates that the influence charge $Q_s$ generated in the scanning electrode of the electrometer probe 6 on the basis of the discharge taking place in dependence on the X-rays, i.e. on the basis of the surface charge density $D_Q$ remaining on the photoconductor, depends only on the distance $d_2$ between the probe and the photoconductor when the photoconductor layer thickness $d_1$ is constant. The same holds good for the influence charge generated in the scanning electrode 7 and originating from the measuring voltage $U_{HF}$. The signal generated on the basis of this voltage, therefore, can be used for measuring the distance between the electrometer probe and the surface of the photoconductor 1.

As has already been described, in dependence on the comparison of the distance measuring signal of each probe with a reference signal, the control unit 26 applies a corresponding control signal to adjusting means which adjust the relevant associated electrometer probe or group of electrometer probes as regards distance from the photoconductor 1. FIGS. 2 and 3 show two embodiments of the device, each time in a sectional view, comprising adjusting means which are based on different principles of operation but whose effect is the same. Such adjusting means can be individually provided for each electrometer probe. However, it is also possible to provide a respective adjusting means for a group comprising several neighboring electrometer probes.

FIG. 2 is a sectional view of an electrometer probe and its associated adjusting means. An electrometer probe 6 comprises a scanning electrode 4 as well as shielding electrodes 8. The scanning electrode 4 on which the charges to be measured are influenced comprises an electrical connection terminal 31 which is connected, in a manner not shown in FIG. 2, for example to the input 9 of the amplifier 10 shown in FIG. 1.

FIG. 2 shows, arranged below the electrometer probe 6, a photoconductor 32 which is provided on a substrate 33. The photoconductor 32 generally has the shape of a drum and is moved relative to the electrometer probe 6 for the scanning of the charge pattern stored thereon, charges being influenced in the scanning electrode 4 in accordance with the charge pattern.

For adjustment of the distance between the electrometer probe 6 and the surface of the photoconductor 32 there are provided adjusting means which comprise (in a manner not shown in FIG. 2) a stationary mount 34 as well as two piezoelectric elements 35 and 36. The mount 34, the two piezoelectric elements 35 and 36, and the electrometer probe 6 are enclosed by a common, electrically conductive envelope 37 which is electrically grounded. The electrometer probe 6 is mechanically connected to the piezoelectric elements 35 and 36 by way of the envelope 37.

Between the two piezoelectric elements 35 and 36 there is arranged an electrode 38 which is connected to an electrical connection terminal 39. The electrode 38 serves to supply the two piezoelectric elements 35 and 36 with electric voltages which cause deformation of the elements 35 and 36 due to the piezoelectric effect. The device is constructed so that the two piezoelectric elements react in an opposite sense. Thus, when the piezoelectric element 35 expands under the influence of a relevant signal on the electrode 38, the element 36 contracts. The same holds good in the opposite sense. When the piezoelectric element 35 expands while the element 36 contracts, the distance between the electrometer probe 6 and the surface of the photoconductor 32 decreases. Conversely, when the piezoelectric element 36 expands and the element 35 contracts, the distance increases.

Evidently, the representation of FIG. 2 is not to scale. In a device as shown in FIG. 2, for example the piezoelectric elements 35 and 36 may have a length of approximately 1 cm which enables a deflection of approximately 100 μm of the device at the area of the electrometer probe, using control voltages amounting to approximately 10 V. This concept also enables a wide control bandwidth, i.e. the adjusting means are capable of following control signals up to a few 100 Hz. It is thus possible to compensate for distance fluctuations also in the case of high scanning speeds, for example a relative speed of 5 m/s with respect to the photoconductor.

The device which is shown in a sectional view in FIG. 3 also comprises an electrometer probe 4 which is provided with an external electrical connection terminal 31 and which is constructed in the same way as the probe 6 shown in FIG. 2. There is provided a drum-shaped substrate 32 which accommodates a photoconductor 33.

The device shown in FIG. 3 comprises a supporting block 41 which is connected, via an elastic tongue 42, to a core 43, the other side of which is mechanically connected to the outer envelope 37 of the electrometer probe 6. The embodiment shown in FIG. 3 comprises two permanent magnet rings 45 and 46 which are mounted on the core 43 so as to extend around the core. There is also provided a magnet coil 44 which is mechanically connected to the supporting block 41, i.e. mounted to be stationary. When a current is applied through the coil 44 and interaction occurs between the magnetic fields from the magnet rings 45, 46 and the coil 44, the magnet rings 45 and 46 are moved, and hence also the core 43. Because the electrometer probe 6 is again mechanically connected to the core 43, it is also moved in a direction perpendicular to the surface of the photoconductor 31.

The electric signal for the magnet coil 44 is extracted in the same way as the control signal for the adjusting means shown in FIG. 2.

What is claimed is:

1. A device for scanning an X-ray image during which a previously locally uniformly charged photoconductor provided on an electrically conductive substrate is discharged in dependence on the local radiation intensity, comprising: a plurality of electrometer probes having output signals for scanning the charge pattern of the photoconductor, means for measuring the distance between the electrometer probes and the photoconductor including means for applying an alternating voltage to the substrate, said electrometer probes for scanning said substrate, means for filtering said voltage in order to extract therefrom distance measuring signals, means responsive to the output signals of the electrometer probes for determining image values of the X-ray image, means responsive to the output signals of at least some of the electrometer probes including said filtering means for generating distance measuring signals manifesting said distance between said at least some probes and said photoconductor, and adjusting means for continuously adjusting the distance between the electrometer probes and the photoconductor to a predetermined reference distance, in dependence on the value of said measuring signals, during the scanning of the X-ray image.

2. A device as claimed in claim 1 wherein the means responsive to the output signals of each electrometer probe includes means for determining the image values as well as the distance measuring signals values.

3. A device as claimed in claim 2 wherein said adjusting means includes means for adjusting the spacing of each electrometer probe to the reference distance to the photoconductor.

4. A device as claimed in claim 2 wherein said adjusting means includes means for adjusting a group of neighboring electrometer probes so that the reference distance is maintained on average for that group.

5. A device as claimed in claim 1 wherein said adjusting means includes piezoelectric means responsive to said latter output signals.

6. A device as claimed in claim 1 wherein said adjusting means includes electrodynamic means responsive to said latter output signals.

7. A device as claimed in claim 1 wherein said means for determining said distance includes means for producing distance measuring signals from the output signals of the electrometer probes via bandpass filters, the measuring signals thus filtered being applied to a control circuit which compares the measuring signals with a reference value signal to produce a control signal, said adjusting means being responsive to said control signal so that the reference distance is maintained.

8. A device as claimed in claim 1 wherein the photoconductor is planar.

9. A device as claimed in claim 1 wherein the photoconductor lies on the surface of a cylinder.

10. An X-ray image scanning device for scanning a locally charged photoconductor on an electrically conductive substrate, the charge pattern on the photoconductor manifesting the local radiation intensity on the photoconductor, said device comprising:
  a plurality of electrometer probes for scanning the charge pattern on said photoconductor, said probes being spaced from said photoconductor;
  means for applying an alternating voltage to said substrate, said probes sensing said voltage during said scanning;
  means responsive to said sensed alternating voltage for determining the distance between at least a portion of said probes and said photoconductor; and
  means responsive to the scanned charge pattern of all said probes for generating an X-ray image output signal representing the values of the image produced by all said probes.

11. The device of claim 10 wherein said means for determining said distance includes means for generating an output signal manifesting said distance, said device further including probe adjustment means responsive said latter output signal for adjusting said distance to a predetermined reference value.

12. The device of claim 11 wherein said means for adjusting includes means for continuously adjusting said distance to said reference value during the scanning of said charge pattern on said photoconductor.

13. The device of claim 10 wherein said means for determining said distance includes filter means for filtering said sensed alternating voltage.

14. A method of scanning a locally charged photoconductor on an electrically conductive substrate, the charge pattern on the photoconductor manifesting the local radiation intensity on the photoconductor, said method comprising:
  scanning the charge pattern on said photoconductor with a plurality of electrometer probes spaced from said photoconductor;
  applying an alternating voltage to said substrate;
  sensing said voltage via said probes during said scanning;
  determining the distance between at least a portion of said probes and said photoconductor in response to said sensing said alternating voltage; and
  generating an X-ray image output signal representing the values of the image produced by all said probes in response to the sensing of the scanned charge pattern of all said probes.

15. The method of claim 14 wherein said step for determining said distance includes generating an output signal manifesting said distance and further including adjusting said distance to a predetermined reference value in response to said latter output signal.

16. The method of claim 14 wherein said determining said distance includes filtering said sensed alternating voltage.

17. The method of claim 15 wherein said adjusting step comprises adjusting said distance for a portion of said probes.

18. The method of claim 15 wherein said adjusting step comprises adjusting said distance for all of said probes.

* * * * *